US012138723B2

(12) United States Patent
Yamane (10) Patent No.: US 12,138,723 B2
(45) Date of Patent: Nov. 12, 2024

(54) MACHINE TOOL AND MACHINE TOOL SELF-DIAGNOSIS METHOD

(71) Applicant: DMG MORI CO., LTD., Nara (JP)

(72) Inventor: Masahiro Yamane, Nara (JP)

(73) Assignee: DMG MORI CO., LTD., Nara (JP)

( * ) Notice: Subject to any disclaimer, the term of this patent is extended or adjusted under 35 U.S.C. 154(b) by 481 days.

(21) Appl. No.: 17/606,673

(22) PCT Filed: Jun. 19, 2020

(86) PCT No.: PCT/JP2020/024223
§ 371 (c)(1),
(2) Date: Oct. 26, 2021

(87) PCT Pub. No.: WO2020/256135
PCT Pub. Date: Dec. 24, 2020

(65) Prior Publication Data
US 2022/0193848 A1    Jun. 23, 2022

(30) Foreign Application Priority Data

Jun. 19, 2019  (JP) ................................ 2019-113896

(51) Int. Cl.
*B23Q 11/00* (2006.01)
*B23Q 11/08* (2006.01)
*B23Q 17/00* (2006.01)

(52) U.S. Cl.
CPC ...... *B23Q 11/0089* (2013.01); *B23Q 11/0825* (2013.01); *B23Q 17/007* (2013.01)

(58) Field of Classification Search
CPC ............ B23Q 11/0089; B23Q 11/0825; B23Q 17/007; B23Q 11/0085; B23Q 11/0891;
(Continued)

(56) References Cited

U.S. PATENT DOCUMENTS 3,886,413 A * 5/1975 Dow ................. F16P 3/148
340/568.1
5,127,190 A   7/1992 Hein et al.
(Continued)

FOREIGN PATENT DOCUMENTS

CN     106514424 A    3/2017
CN     109138714 A    1/2019
(Continued)

OTHER PUBLICATIONS

International Search Report, PCT/JP2020/024223, dated Aug. 25, 2020, 2 pages.
(Continued)

*Primary Examiner* — Ziaul Karim
(74) *Attorney, Agent, or Firm* — Stinson LLP (57) ABSTRACT

A machine tool including a fixed cover and a movable cover for covering at least part of a machining region includes a cover control device that includes a driving circuit for driving the movable cover, an abnormality detection device that detects an abnormality while the movable cover is driven, a self-diagnosis device that performs evaluation on whether the abnormality detection device is normal, and an output device that outputs a result of the evaluation by the self-diagnosis device. The self-diagnosis device is configured to perform the evaluation on whether the abnormality detection device is normal based on an operating state of the abnormality detection device at a time when a pseudo abnormality is generated on the movable cover by driving the movable cover via the driving circuit.

17 Claims, 7 Drawing Sheets

(58) Field of Classification Search
CPC . B23Q 11/00; B23Q 11/08; F16P 3/08; G05B 19/406; G05B 23/0235; G05B 2219/33297; G05B 2219/33323
See application file for complete search history.

(56) References Cited

U.S. PATENT DOCUMENTS

| | | | |
|---|---|---|---|
| 5,200,678 A * | 4/1993 | Tokashiki | G05B 19/4062 |
| | | | 318/606 |
| 11,891,840 B2 * | 2/2024 | Asano | E05B 17/22 |
| 2016/0024834 A1 * | 1/2016 | Nagao | E05F 15/652 |
| | | | 49/404 |
| 2017/0176969 A1 * | 6/2017 | Asano | B23Q 17/007 |
| 2017/0334087 A1 * | 11/2017 | Gass | F16P 3/147 |

FOREIGN PATENT DOCUMENTS

| | | |
|---|---|---|
| CN | 208358404 U | 1/2019 |
| JP | H078776 U | 2/1995 |
| JP | H11018202 A | 1/1999 |
| JP | 2008-121188 A | 5/2008 |
| JP | 2009-155826 A | 7/2009 |
| JP | 2012-158922 A | 8/2012 |
| JP | 2014181544 A | 9/2014 |
| JP | 2019-069492 A | 5/2019 |

OTHER PUBLICATIONS

Supplementary European Search Report, European Application No. 20825538.0, mailed Jun. 1, 2023, 8 pages.

* cited by examiner

MACHINE TOOL AND MACHINE TOOL SELF-DIAGNOSIS METHOD

REFERENCE TO RELATED APPLICATIONS

This application is the 371 U.S. national stage application of International Patent Application No. PCT/JP2020/024223, filed Jun. 19, 2020, which claims the benefit of Japanese Patent Application No. 2019-113896, filed Jun. 19, 2019, the entire disclosures of which are incorporated herein by reference.

TECHNICAL FIELD

The present invention relates to a machine tool including a fixed cover and a movable cover for covering at least part of a machining region, and a self-diagnosis method for the machine tool.

BACKGROUND ART

PTL 1 discloses a machine tool cover that prevents powdery chips produced in a cutting process or a coolant discharged to a machining region from dispersing to the surroundings and includes a door openable and closable by sliding so as to load and unload a workpiece and perform maintenance such as cleaning.

The machine tool cover at least includes a front plate portion, which covers the front side of the machine tool and has a front opening portion, and an upper plate portion, which covers the upper side of the machine tool and has an upper opening portion while a front door, which can open and close the front opening portion, is provided on the front plate portion and a ceiling shutter, which can open and close the upper opening portion, is provided on the upper plate portion.

The front door and the ceiling shutter are attached so as to be capable of performing opening and closing movements as mutually separate units, and a front guide is provided toward the front door to guide the opening and closing movements of the ceiling shutter on the front side, and a rear guide for the rear side and an actuator, which causes the opening and closing movements of the ceiling shutter, are each provided toward the upper plate portion.

PTL 2 discloses a slide door aimed at providing a door that can open and close with high speed through automation of the opening and closing while causing less abrasion or damage in a door driving mechanism.

The slide door is constituted of first and second doors for opening and closing, in a sliding manner, an opening provided on a fixed cover for covering a machining space of a machine tool, and includes a first nut fixed to the first door, a first ball screw engaged threadedly to the first nut, a second ball screw placed in parallel with the first ball screw; a second nut engaged threadedly to the second ball screw and fixed to the second door, and a motor for driving the first and second ball screws via a power transmission mechanism.

PTL 3 discloses a machine tool provided with a door opening/closing device that can prevent a worker or a robot from becoming pinched by an automatic opening/closing door by an erroneous operation of a worker or in a sporadic accident. The machine tool is provided with the door opening/closing device, which includes a movable door, a door opening/closing drive motor that drives the movable door, and a power transferring mechanism that transfers power of the door opening/closing drive motor to the movable door. Further provided are a disturbance torque estimation unit, which estimates disturbance torque applied to the door opening/closing drive motor at an opening/closing operation of the movable door, a torque comparison unit, which compares the disturbance torque estimated by the disturbance torque estimation unit with a predetermined first upper limit and a predetermined first lower limit, and a motor stop unit, which stops the opening/closing operation of the movable door when the torque comparison unit determines that the disturbance torque is larger than the first upper limit or when the disturbance torque is smaller than the first lower limit.

CITATION LIST

Patent Literature

[PTL 1] Japanese Laid-Open Patent Publication No. 2019-69492
[PTL 2] Japanese Laid-Open Patent Publication No. 2016-28837
[PTL 3] Japanese Laid-Open Patent Publication No. 2017-109286

SUMMARY OF INVENTION

Technical Problem

The present applicant has also filed an application on a machine tool including a motor driving mechanism that drives sliding of a door, which is provided with a pinching detection mechanism that detects pinching of a worker, a robot, or the like, and a safety mechanism configured to stop or open the door if a human or the like is pinched (Japanese Patent Application No. 2018-205367).

However, if breakage of a component, for example, is occurring in the above-described safety mechanism included in the door opened and closed automatically, the safety mechanism can fail to operate appropriately in case of pinching of a worker or a robot by the door.

In view of the above-described problem, an object of the present invention is to provide a machine tool that can perform self-diagnosis on whether a safety mechanism operates properly and to provide a self-diagnosis method for the machine tool.

Solution to Problem

To attain the object, a machine tool according to the present invention is a machine tool including a fixed cover and a movable cover for covering at least part of a machining region, the machine tool including a cover control device that includes a driving circuit for driving the movable cover, an abnormality detection device that detects an abnormality while the movable cover is driven, a self-diagnosis device that performs evaluation on whether the abnormality detection device is normal, and an output device that outputs a result of the evaluation by the self-diagnosis device, where the self-diagnosis device is configured to perform the evaluation on whether the abnormality detection device is normal based on an operating state of the abnormality detection device at a time when a pseudo abnormality is generated on the movable cover by driving the movable cover via the driving circuit.

Further, a self-diagnosis method for a machine tool according to the present invention is a self-diagnosis method for a machine tool including a cover control device that drives a movable cover via a driving circuit and an abnormality detection device that detects an abnormality while the movable cover is driven, the self-diagnosis method including a pseudo abnormality generation step of generating a pseudo abnormality on the movable cover by driving the movable cover via the driving circuit, a self-diagnosis step of, when the pseudo abnormality is generated by the pseudo abnormality generation step, performing evaluation on whether the abnormality detection device is normal based on whether the abnormality is detected by the abnormality detection device, and an output step of outputting a result of the evaluation by the self-diagnosis step.

Advantageous Effects of Invention

The present invention provides a machine tool that can perform self-diagnosis on whether a safety mechanism operates properly and a self-diagnosis method for the machine tool.

While the novel features of the present invention are set forth in the appended claims, the present invention, both as to organization and content, will be better understood, along with other objects and features thereof, from the following detailed description taken in conjunction with the drawings.

DESCRIPTION OF EMBODIMENTS

[Basic Embodiment of Machine Tool and Self-Diagnosis Method for Machine Tool]

Prior to description of specific embodiments using the drawings, a basic concept of a machine tool and a self-diagnosis method for the machine tool according to the present invention is described below.

The machine tool according to the present invention is a machine tool with a fixed cover and a movable cover for covering at least part of a machining region, the machine tool including a cover control device that includes a driving circuit for driving the movable cover, an abnormality detection device that detects an abnormality while the movable cover is driven, a self-diagnosis device that performs evaluation on whether the abnormality detection device is normal, and an output device that outputs a result of the evaluation by the self-diagnosis device, where the self-diagnosis device is configured to perform the evaluation on whether the abnormality detection device is normal based on an operating state of the abnormality detection device at a time when a pseudo abnormality is generated on the movable cover via the driving circuit.

The movable cover is driven by the cover control device via the driving circuit to open and close for example, and at that time, the abnormality detection device detects an abnormality, such as pinching while the movable cover is driven. The self-diagnosis device generates a pseudo abnormality for diagnosis by driving the movable cover via the driving circuit and monitors the operating state of the abnormality detection device. If an abnormality is detected by the abnormality detection device, the abnormality detection device is evaluated as functioning normally and if no abnormality is detected, the abnormality detection device is evaluated as having a failure, and the results of the evaluation are output to the output device. For example, the self-diagnosis device generates a pseudo abnormality on the movable cover independently of the opening and closing control of the movable cover by the cover control device, or in conjunction with the opening and closing control of the movable cover, and diagnosis is enabled on whether the abnormality detection device is appropriately operating, which prevents a worker or a robot from actually becoming pinched by the movable cover.

It is preferable that the self-diagnosis device is configured to generate the pseudo abnormality by driving the movable cover lying in a closed position in a closing direction via the driving circuit because the pseudo abnormality can be generated easily without the possibility of a worker or the like actually becoming pinched.

It is preferable that the self-diagnosis device is configured to generate the pseudo abnormality by driving the movable cover lying in a closed position and locked mechanically in an opening direction via the driving circuit because the pseudo abnormality can be generated easily by driving the movable cover locked mechanically in an opening direction.

It is preferable that the self-diagnosis device is configured to generate the pseudo abnormality by driving the movable cover lying in a fully open position in an opening direction via the driving circuit because the pseudo abnormality can be generated easily with little possibility of a worker or the like actually becoming pinched.

It is preferable that the self-diagnosis device is configured to generate the pseudo abnormality by driving the movable cover lying between a fully open position and a closed position via the driving circuit through application of torque higher than predetermined torque, and the pseudo abnormality can be generated easily.

In any of the above-described aspects, it is more preferable that the cover control device includes the driving circuit, a motor driven by the driving circuit, and a power transmission mechanism that transmits power from an output shaft of the motor to the movable cover, and the abnormality detection device includes a support mechanism that supports the motor so that the motor is pivotable about the output shaft of the motor, and an abnormality determination circuit that determines abnormality by detecting a pivoting state of the motor supported by the support mechanism based on reaction force applied from the movable cover to the motor through the power transmission mechanism while the movable cover is driven, and pinching of a worker or the like can be detected properly by the reaction force causing the motor to pivot.

In any of the above-described aspects, it is more preferable that the cover control device includes the driving circuit, a motor driven by the driving circuit, and a power transmission mechanism that transmits power from an output shaft of the motor to the movable cover, and the abnormality detection device includes a torque detection circuit that detects torque exerted on the output shaft of the motor while the movable cover is driven, and an abnormality determination circuit that determines abnormality when the torque detected by the torque detection circuit deviates from a predetermined range, and with a simple configuration, pinching of a worker or the like can be detected properly.

In any of the above-described aspects, it is more preferable that the cover control device includes the driving circuit, a motor driven by the driving circuit, and a power transmission mechanism that transmits power from an output shaft of the motor to the movable cover, and the abnormality detection device includes a pressure sensor that is provided on the movable cover, and an abnormality determination circuit that determines abnormality when pressure detected by the pressure sensor while the movable cover is driven is higher than predetermined pressure, and with a simple configuration, pinching of a worker or the like can be detected properly.

In any of the above-described aspects, it is more preferable that driving of the cover control device is prohibited if the self-diagnosis device evaluates the abnormality detection device as being abnormal, and safety can be secured with reliability.

In any of the above-described aspects, it is more preferable that manual opening of the movable cover is allowed if the self-diagnosis device evaluates the abnormality detection device as being abnormal, and the movable cover can be opened at least manually and a worker or a robot can perform exchange of a workpiece or maintenance without hindrance.

In any of the above-described aspects, it is more preferable that the self-diagnosis device is configured to be operated when the machine tool is started or stopped, and loss of operation time caused by frequent self-diagnoses can be reduced.

The self-diagnosis method for the machine tool according to the present invention is a self-diagnosis method for a machine tool including a cover control device that drives a movable cover via a driving circuit and an abnormality detection device that detects an abnormality while the movable cover is driven, the self-diagnosis method including a pseudo abnormality generation step of generating a pseudo abnormality on the movable cover by driving the movable cover via the driving circuit, a self-diagnosis step of, when the pseudo abnormality is generated by the pseudo abnormality generation step, performing evaluation on whether the abnormality detection device is normal based on whether the abnormality is detected by the abnormality detection device, and an output step of outputting a result of the evaluation by the self-diagnosis step.

Preferably, the self-diagnosis step is a step of generating the pseudo abnormality by driving the movable cover lying in a closed position in a closing direction via the driving circuit.

Preferably, the self-diagnosis step is a step of generating the pseudo abnormality by driving the movable cover lying in a closed position and locked mechanically in an opening direction via the driving circuit.

Preferably, the self-diagnosis step is a step of generating the pseudo abnormality by driving the movable cover lying in a fully open position in an opening direction via the driving circuit.

Preferably, the self-diagnosis step is a step of generating the pseudo abnormality by driving the movable cover lying between a fully open position and a closed position via the driving circuit through application of torque higher than predetermined torque.

Preferably, the self-diagnosis step is performed when the machine tool is started or stopped.

[Specific Embodiment of Machine Tool]

An embodiment of the present invention is described in detail below with reference to the drawings.

Figure 1:
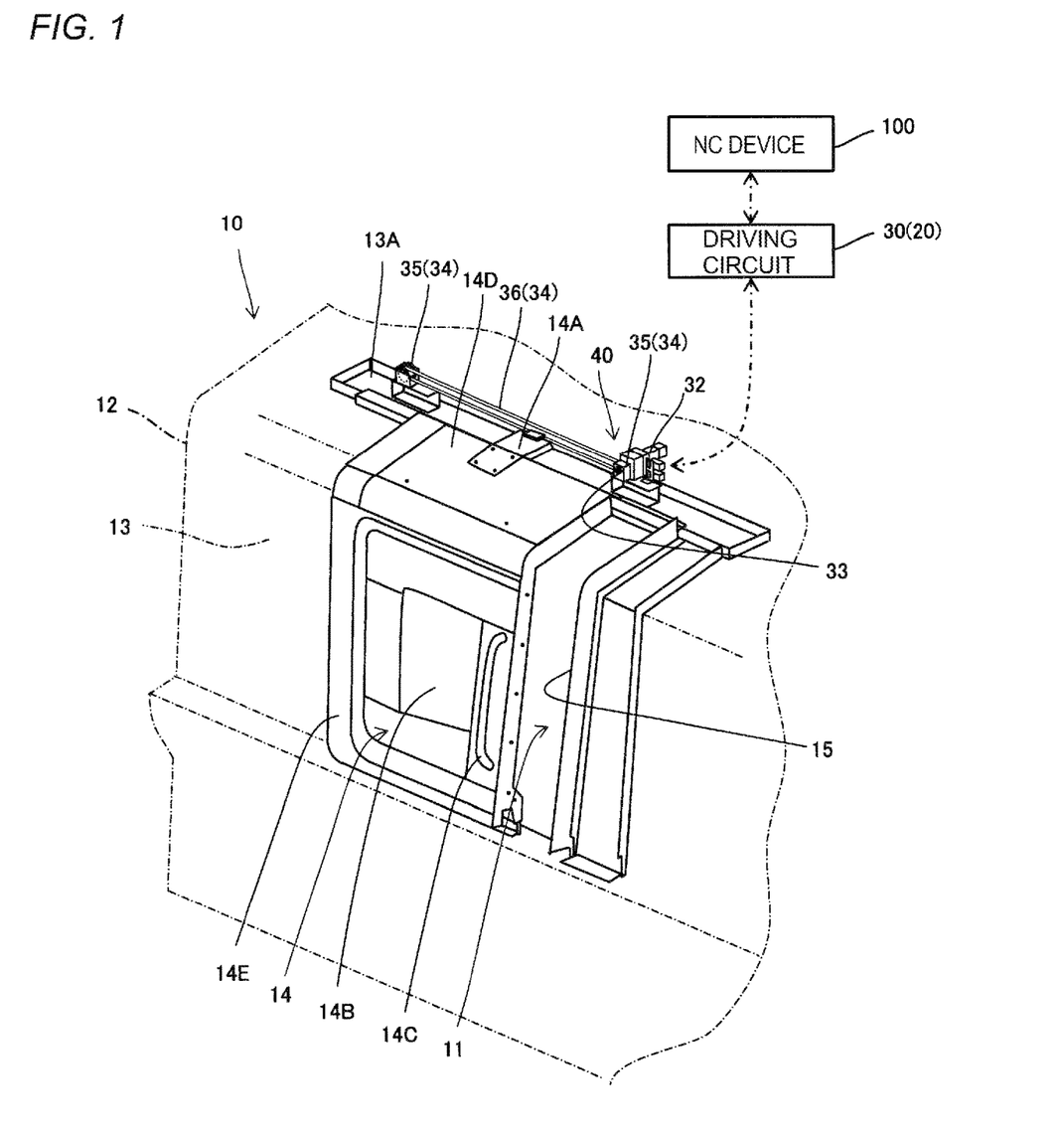
FIG. 1 is an explanatory diagram for a principal part of a machine tool with a fixed cover and a movable cover for covering at least part of a machining region.

In FIG. 1, an oblique view of a principal part of a machine tool 10 is illustrated. The machine tool 10 is a numerically control (NC) lathe including an NC device (numerically controller) 100 that causes a workpiece fixed to a main shaft and a tool fixed to a tool rest to move relatively through numerical control using a computer to allow the workpiece to be machined into a desired shape.

A cover body 12 is disposed so as to cover at least part of a machining region 11, which is a region where the workpiece and the tool move relatively. The cover body 12 is also referred to as a splash guard and includes a fixed cover 13 and a movable cover 14 that moves relative to the fixed cover 13. The movable cover 14 slides along an opening 15 formed in the fixed cover 13 so that the opening 15 is switched between the open state and closed state.

The cover body 12 is provided so as to prevent powdery chips produced in a cutting process of a workpiece or a coolant discharged to a machining portion from dispersing to the surroundings, and the movable cover 14 is opened and closed so as to allow a worker to carry a workpiece into the machining region 11 and carry the workpiece out of the machining region 11 through the opening 15, and additionally perform maintenance such as cleaning of the machining region 11. The movable cover 14 includes a ceiling wall 14D and a front wall 14E that extends downward from the ceiling wall 14D, and the front wall 14E is provided with a transparent window 14B made of resin so as to enable the machining region to be visually checked from the outside and with a grip part 14C so as to enable manual opening and closing operations.

The opening and closing of the movable cover 14 is controlled by a cover control device 20 that operates in accordance with an opening command or a closing command from the NC device 100. The cover control device 20 includes a driving circuit 30, which drives the movable cover 14, a servo motor (hereinafter, simply referred to as the "motor") 32, which is driven by the driving circuit 30, and a power transmission mechanism 34, which transmits power from an output shaft 33 of the motor 32 to the movable cover 14.

The power transmission mechanism 34 includes a pair of pulleys 35, which are provided on a ceiling wall 13A of the fixed cover 13, and a timing belt 36, which is wound between the pulleys 35, and one of the pulleys 35 is fixed to the output shaft 33 of the motor 32. In addition, an inside edge on the ceiling wall 14D of the movable cover 14 is fixed to the timing belt 36 with interposition of a metal coupler 14A.

When the motor 32 rotates and is driven in one direction, the movable cover 14 is driven in a closing direction via the timing belt 36, and when the motor 32 rotates and is driven in an opposite direction, the movable cover 14 is driven in an opening direction via the timing belt 36.

An abnormality detection device 40, which detects an abnormality while the movable cover 14 is driven, is provided on the ceiling wall 13A of the fixed cover 13, and the motor 32 is supported by the abnormality detection device 40 so that the output shaft 33 of the motor 32 can pivot about its axis. The abnormality detection device 40 is provided so as to detect impact caused in case of accidental pinching of a workpiece carrying-in/out robot or a worker while the movable cover 14 is driven and promptly stop the movable cover 14 or drive the movable cover 14 in an opposite direction.

Figure 3:
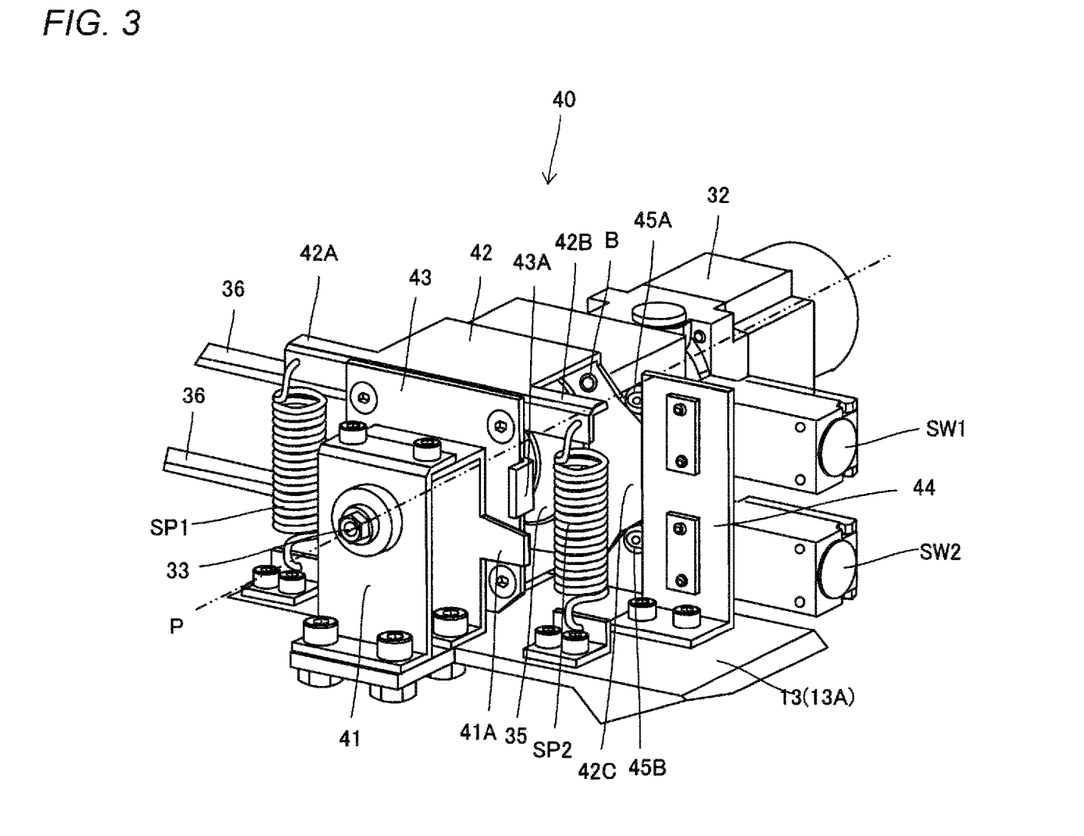
FIG. 3 is an oblique view illustrating an example of an abnormality detection device that is provided in a driving mechanism of the movable cover and detects a pinching abnormality.

FIG. 3 illustrates the abnormality detection device 40. The abnormality detection device 40 includes a support mechanism that supports the motor 32 so that the motor 32 can pivot about the output shaft 33 of the motor 32, and an abnormality determination circuit that determines abnormality by detecting a pivoting state of the motor 32 supported by the support mechanism on the basis of the reaction force applied from the movable cover 14 to the motor 32 through the power transmission mechanism 34 while the movable cover 14 is driven.

The support mechanism includes a support angle 41, which is fixed to the ceiling wall 13A of the fixed cover 13, an intermediate bracket 42, to which the casing of the motor 32 is fixed with a bolt B, and an intermediate plate 43, which is fixed to the intermediate bracket 42.

The output shaft 33 of the motor 32 is pivotably fixed to the support angle 41 with interposition of the intermediate bracket 42 and the intermediate plate 43, and the intermediate bracket 42 and the intermediate plate 43 are pivotably supported with respect to the support angle 41 integrally with the motor 32. In FIG. 3, the reference sign P denotes the rotational axis of the motor 32 and also denotes the pivotal axis of the motor 32 relative to the support angle 41. That is, the rotational axis and the pivotal axis of the motor 32 agree.

The pulley 35 is placed between the motor 32 and the intermediate plate 43 and the timing belt 36 is wound around the pulley 35. Arm portions 42A and 42B are formed on the intermediate plate 43 so as to extend leftward and rightward when viewed in the direction of the rotational axis P, and springs SP1 and SP2, which are elastic members, are positioned respectively between the arm portions 42A and 42B and the ceiling wall of the fixed cover 13.

When being in a neutral position where the tensile force by the spring SP1 and the tensile force by the spring SP2 are balanced, the arm portions 42A and 42B on the left and right are maintained in horizontal attitudes and when the springs SP1 and SP2 are unbalanced, a tilt occurs toward one of the sides. That is, the motor 32 and the intermediate bracket 42 pivot about the pivotal axis P.

That is, the support angle 41, the intermediate bracket 42, the intermediate plate 43, and the springs SP1 and SP2 constitute the support mechanism.

The intermediate bracket 42 is provided with a pivotal piece 42C, which extends rightward when viewed in the direction of the rotational axis P, similar to the arm portions 42A and 42B, and a pair of actuators 45A and 45B, which detects the pivoting state of the pivotal piece 42C, and switches SW1 and SW2, which are operated according to actuators 45A and 45B, are fixed to an angle 44 fixed to the ceiling wall of the fixed cover 13.

When the pivotal piece 42C pivots upward, the switch SW1 is operated to be turned on via the actuator 45A, and when the pivotal piece 42C pivots downward, the switch SW2 is operated to be turned on via the actuator 45B. That is, the switches SW1 and SW2 serve as the abnormality determination circuit that detects the pivoting state of the motor 32 and determines abnormality.

Although limit switches constitute the switches SW1 and SW2 in the present embodiment, a switch element of another type, such as a reed switch or a photo-interrupter, can be used as appropriate, and in that case, a suitable actuator for operating each switch element, such as a magnet or a light shielding plate, can be installed.

To limit the degree of the pivoting of the motor 32 and avoid breakage of the switches SW1 and SW2 or the like, the support angle 41 includes reception lugs 41A that are formed to extend on the left and right and structured so as to be engageable with projections 43A, which are formed to extend on the left and right of the intermediate plate 43.

For example, if a workpiece carrying-in/out robot or a worker becomes pinched while the movable cover 14 is driven in a closing direction, the reaction force of the movable cover 14 that acts due to its impact causes abnormal tension to act on the timing belt 36 and at this time, the motor 32 and the intermediate bracket 42 pivot around the pivotal axis P. When the pivoting state is detected through the switches SW1 and SW2, it is detected that a workpiece carrying-in/out robot, a worker, or the like is pinched.

Figure 4:
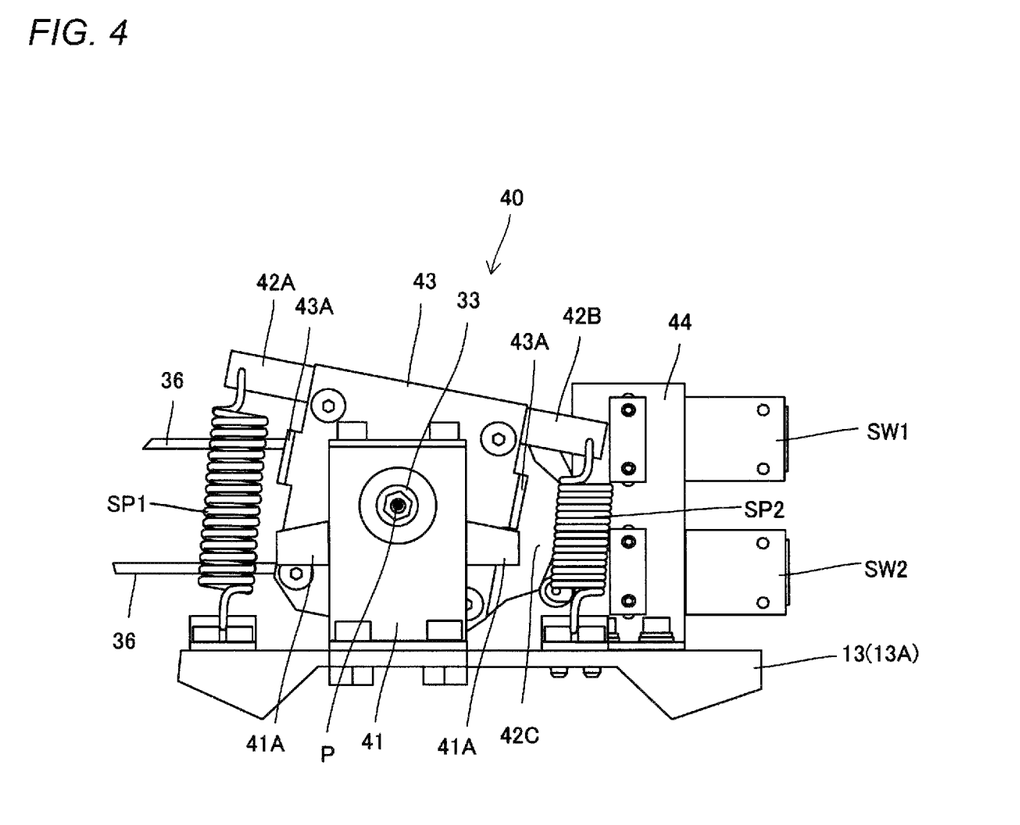
FIG. 4 is an explanatory diagram for operation in a case where an abnormality is detected by the abnormality detection device.

FIG. 4 illustrates the state where the arm portions 42A and 42B on the left and right tilt in one direction from horizontal attitudes and the switch SW2 is turned on.

The machine tool 10 is provided with a self-diagnosis device 54, which diagnoses whether the abnormality detection device 40 functions normally, and an output device, which outputs the result of the diagnosis by the self-diagnosis device 54.

The self-diagnosis device 54 is configured to evaluate whether the abnormality detection device 40 is normal on the basis of the operating state of the abnormality detection device 40 at the time when a pseudo abnormality is generated on the movable cover 14 via the driving circuit 30.

Figure 2:
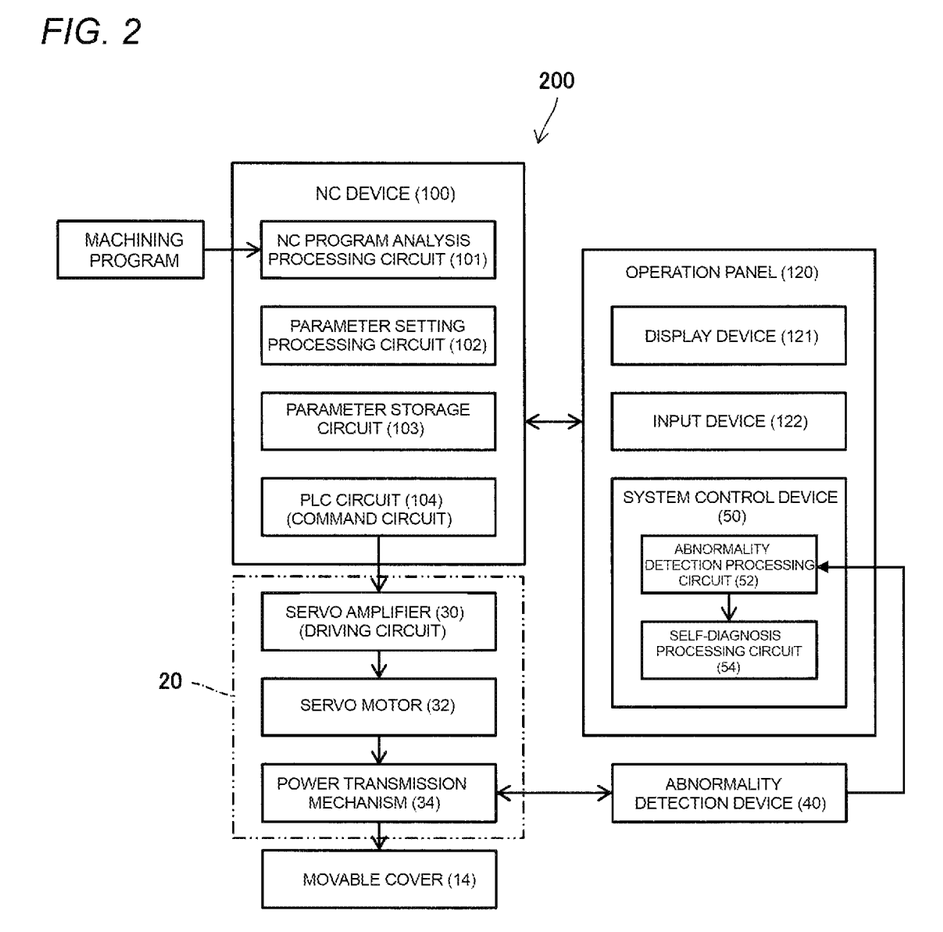
FIG. 2 is an explanatory diagram illustrating function blocks of a control system of the movable cover for the machine tool.

FIG. 2 illustrates a function block of a cover control system 200 in the control system of the machine tool 10 including the NC device 100, which is for controlling the cover body 12. The cover control system 200 includes the NC device 100, an operation panel 120, and the cover control device 20.

The NC device 100 includes an analysis processing circuit 101, which analyzes an NC program that has been input, a parameter setting processing circuit 102, which sets a parameter needed to execute each NC program on the basis of the result of the analysis by the analysis processing circuit 101, a parameter storage circuit 103, which stores a parameter, and a command circuit 104, that is, a PLC circuit, which reads a necessary parameter from the parameter storage circuit 103 in accordance with a command analyzed in the analysis processing circuit 101 and outputs a command to the cover control device 20. The NC device 100 includes peripheral circuits, such as a microcomputer, ROM, and an input and output circuit, and each circuit block exerts a desired function by a control program stored in the ROM being executed in the microcomputer.

The analysis processing circuit 101 analyzes the direction of the movement of the movable cover 14 on the basis of an opening command or a closing command to the movable cover, which is included in the NC program, and the parameter setting processing circuit 102 sets the distance of the movement of the movable cover.

As already described, the cover control device 20 includes the driving circuit 30 that drives the movable cover 14, the motor 32 that is driven by the driving circuit 30, and the power transmission mechanism 34 that transmits power from the output shaft 33 of the motor 32 to the movable cover 14. The driving circuit 30 functions as a servo amplifier that servo-controls the movable cover 14 on the basis of a command from the command circuit 104.

The driving circuit 30 drives the motor 32 at a predetermined speed while monitoring an encoder pulse signal transmitted from the motor 32 and the value of the current supplied to the motor 32, and performs servo-control so that the movable cover 14 moves to a predetermined position. For example, the movable cover 14 is moved by a predetermined distance from the fully closed position to the fully open position in response to the opening command, and for example, the movable cover 14 is moved by the predetermined distance from the fully open position to the fully closed position in response to the closing command.

The operation panel 120 includes a display device 121, for which a liquid crystal monitor or the like is used, an input device 122, for which a keyboard or a touch panel is used, and a system control device 50 for the cover. The system control device 50 includes an abnormality detection processing circuit 52, which processes an output of the abnormality detection device 40, and a self-diagnosis processing circuit 54, which functions as a self-diagnosis device. The operation panel 120 is also provided with peripheral circuits, such as a microcomputer, ROM, and an input and output circuit, and each circuit block exerts a desired function by a control program stored in the ROM being executed in the microcomputer.

The input device 122 is provided with a manual operation key, which allows manual opening and closing operations for the movable cover 14, and when the key is operated to be turned on, except for a case with a possibility of hindering security like in a machining process on a workpiece, the state of the motor 32 being locked is canceled via the command circuit 104 and the indication that manual opening and closing is possible is displayed on the display device 121 so as to allow a manual operation for the movable cover 14.

Figure 5:
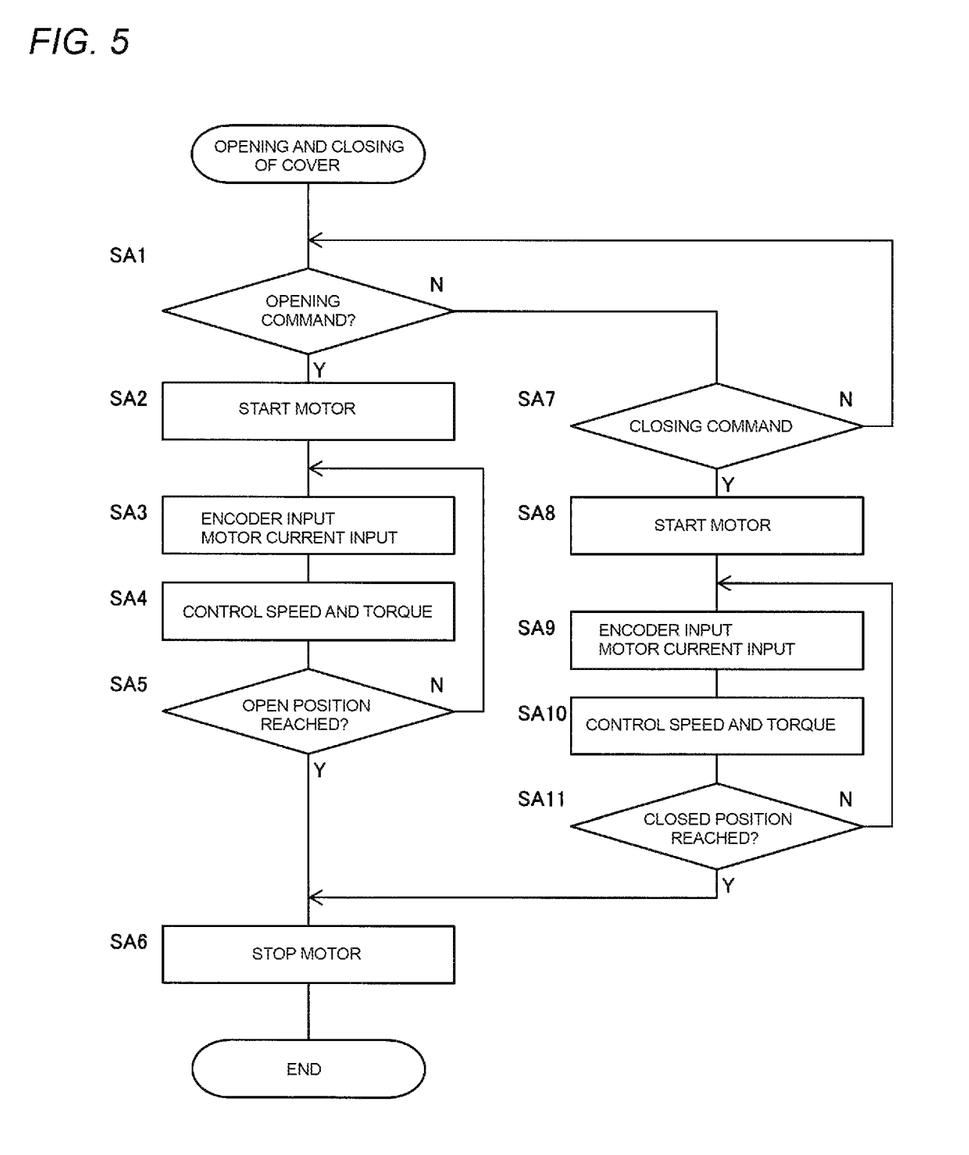
FIG. 5 is a flowchart illustrating an opening and closing procedure of the movable cover performed by a cover control device.

FIG. 5 illustrates a basic control procedure performed on the movable cover 14 by the driving circuit 30, which is a servo amplifier. If an opening command is input from the command circuit (PLC) (SA1), the motor 32 is started and the movable cover 14 in a closed state is driven in an opening direction (SA2).

A signal from an encoder included in the motor 32 and the value of the current flowing through a feeder to the motor, which is measured by an ammeter, are input (SA3), and the speed and torque of the motor 32 are controlled to be target values (SA4). The process from steps SA3 to SA5 is repeated until the distance calculated on the basis of the value of the signal from the encoder and the value of the command from the command circuit (PLC) 104 agree, and if it is determined that the movable cover 14 has reached the fully open position (SA5), the motor 32 is stopped (SA6).

If a closing command is input from the command circuit (PLC) 104 (SA7), the motor 32 is started and the movable cover 14 in an open state is driven in a closing direction (SA8). A signal from the encoder included in the motor 32 and the current flowing through the feeder to the motor, which is measured by the ammeter, are input (SA9), and the speed and torque of the motor 32 are controlled to be target values (SA10). The process from steps SA9 to SA11 is repeated until the distance calculated on the basis of the value of the signal from the encoder and the value of the command from the command circuit (PLC) agree, and if it is determined that the movable cover 14 has reached the fully closed position (SA11), the motor 32 is stopped (SA6). Not to mention, a soft start process is performed at the time of starting the motor 32, and a process to stop the motor while reducing the speed is performed at the time of stopping the motor.

Figure 6:
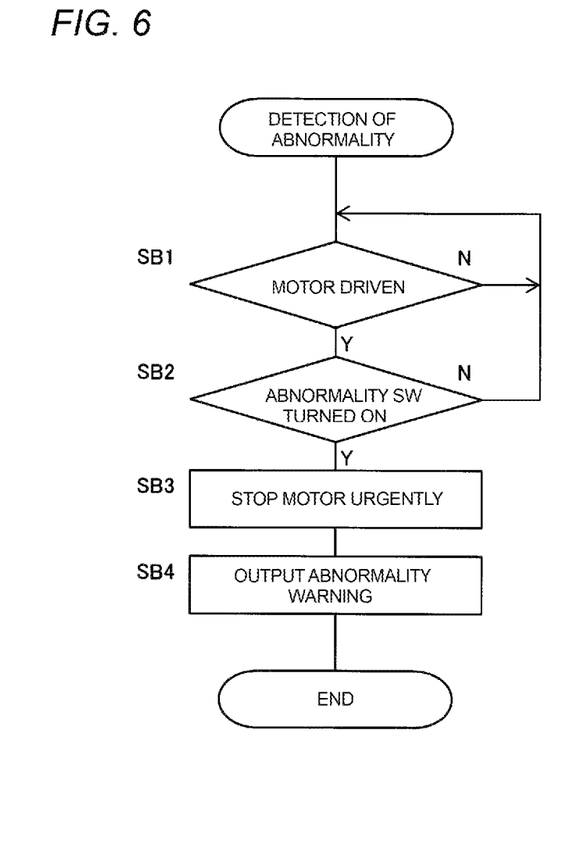
FIG. 6 is a flowchart illustrating an abnormality detection procedure performed by the abnormality detection device.

FIG. 6 illustrates a procedure of an abnormality detection process performed in the abnormality detection processing circuit 52, which processes a signal from the abnormality detection device 40.

The abnormality detection processing circuit 52 determines whether the motor 32 is driven, and if the motor 32 is driven (SB1), determines whether any of the switches SW1 and SW2 of the abnormality detection device 40 is turned on (SB2).

If any of the switches SW1 and SW2 of the abnormality detection device 40 is turned on, it is determined that an abnormality such as pinching has occurred (SB2) and the motor 32 is stopped urgently (SB3), and an abnormality warning is output to the display device of the operation panel 120 (SB4). When the operation panel 120 includes a sounding mechanism such as a buzzer, the abnormality warning is output to the display device and an abnormality alarm is issued to the surroundings by the sounding mechanism driven.

Figure 7:
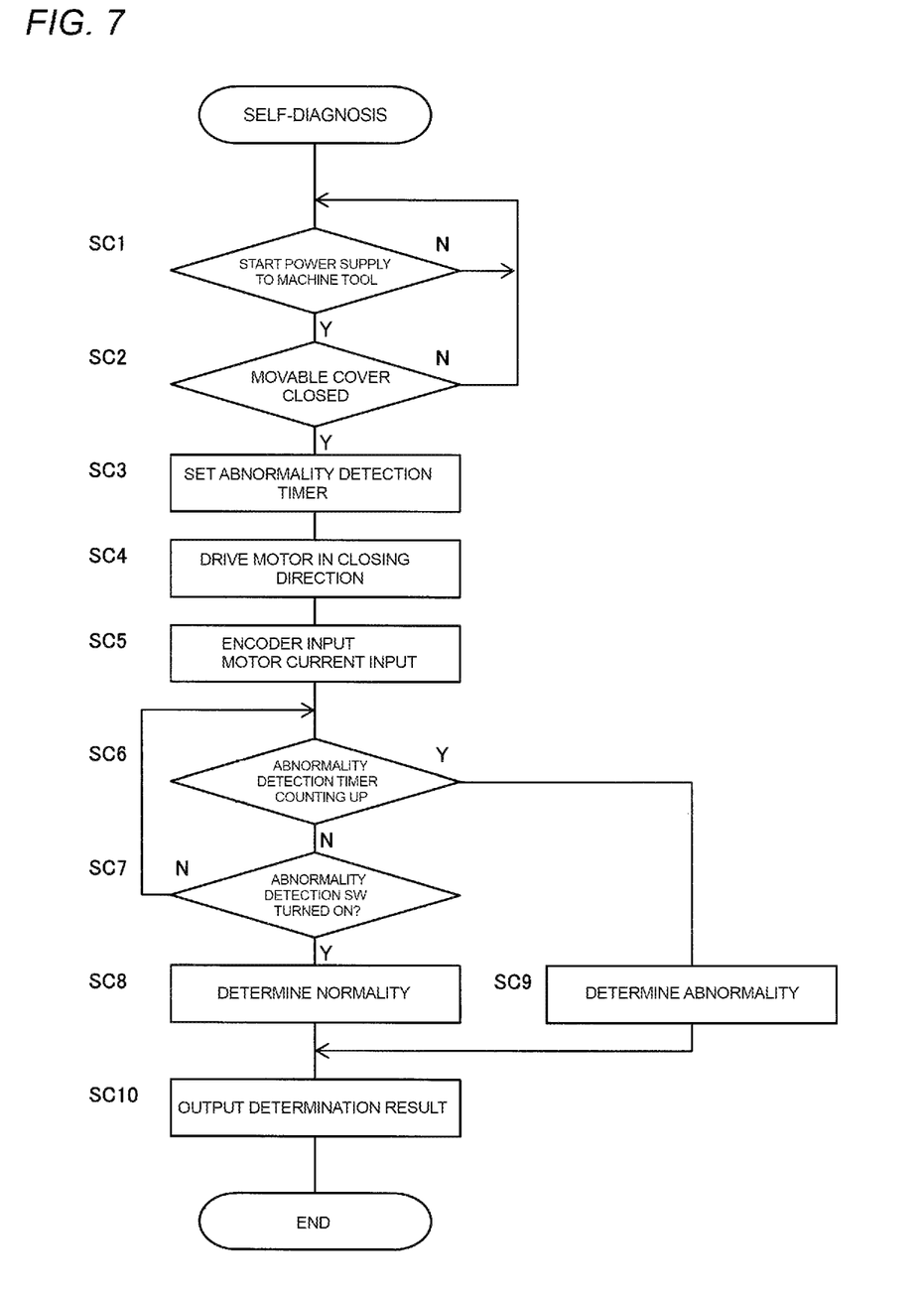
FIG. 7 is a flowchart illustrating an example of a self-diagnosis procedure performed by the self-diagnosis device.

FIG. 7 illustrates a procedure of a self-diagnosis process performed in the self-diagnosis processing circuit 54.

The self-diagnosis processing circuit 54 is operated if power is supplied to the machine tool 10 for the first time in a day (SC1) and if the movable cover 14 lies in the fully closed position (SC2).

The self-diagnosis processing circuit 54 firstly sets an abnormality detection timer (SC3) and after that, commands the driving circuit 30 via the command circuit 104 to drive the movable cover 14 in a closing direction in a self-diagnosis mode (SC4) and inputs an encoder pulse and a motor current value (SC5). The movable cover 14 in a state of being fully closed is incapable of moving even if the motor 32 is driven, and encoder pulses with predetermined periodicity, which are expected to be input when the motor is driven from the normal, fully open state, are not input and in addition, driving current for the motor 32 rises gradually.

With the rise in drive current, large tension is added to the timing belt 36 via the motor 32 and the reaction force thereof causes the motor 32 supported by the support mechanism to pivot with the intermediate bracket 42. That is, a pseudo abnormal state is caused. If no failure is occurring in the abnormality detection device 40 including the switches SW1 and SW2, the switch SW2 for the abnormality detection is turned on shortly (SC7). If some failure has occurred in the abnormality detection device 40 and the switch SW2 is not turned on, the abnormality detection timer set in step SC3 counts up (SC6).

If the switch SW2 is turned on before the abnormality detection timer counts up, the abnormality detection device 40 determines normality (SC8), and if the abnormality detection timer counts up, the abnormality detection device 40 determines abnormality (SC9), and the determination result is displayed on the display device 121 and the buzzer is sounded via a sounding circuit included in the operation panel 120 (SC10). Concurrently, a signal indicating that a failure is occurring in the abnormality detection device 40 is also output to the NC 100. When the determination ends in steps SC8 and SC9, the motor 32 is stopped.

If the self-diagnosis device 54 evaluates the abnormality detection device 40 as being abnormal, driving of the cover control device 20 is prohibited. If the self-diagnosis device 54 evaluates the abnormality detection device 40 as being abnormal, manual opening of the movable cover 14 may be allowed when necessary. When manual opening and closing is enabled, even if automatic control of the movable cover 14 is impossible, a worker can exchange a workpiece or perform a maintenance operation such as cleaning.

As described above in the present embodiment, included are the cover control device 20, which includes the driving circuit 30 that drives the movable cover 14, the abnormality detection device 40, which detects an abnormality while the movable cover 14 is driven, the self-diagnosis device 54, which performs evaluation on whether the abnormality detection device 40 is normal, and an output device (the display device 121 and the sounding mechanism), which outputs a result of the evaluation by the self-diagnosis device 54, and the self-diagnosis device 54 is configured to perform the evaluation on whether the abnormality detection device 40 is normal on the basis of the operating state of the abnormality detection device 40 at the time when a pseudo abnormality is generated on the movable cover 14 via the driving circuit 30.

Further, the self-diagnosis device 54 is configured to generate a pseudo abnormality by driving the movable cover 14 lying in a closed position in a closing direction via the driving circuit 30.

Further, the machine tool 10 performs a self-diagnosis method including a pseudo abnormality generation step (steps SC1 to SC4 in FIG. 7) of generating a pseudo abnormality on the movable cover 14, a self-diagnosis step (steps SC5 to SC9 in FIG. 7) of, when the pseudo abnormality is generated in the pseudo abnormality generation step, performing evaluation on whether the abnormality detection device 40 is normal on the basis of whether an abnormality is detected by the abnormality detection device 40, and an output step (SC10) of outputting a result of the evaluation by the self-diagnosis step.

Another embodiment of the present invention is described below.

In step SC7 in FIG. 7, it is determined whether the switch SW2 of the abnormality detection device 40 operates appropriately and it is not determined whether the switch SW1 operates appropriately.

Thus, when it is determined in step SC8 that the switch SW2 is normal, energization to the motor 32 may be stopped immediately and the motor 32 may be caused by the reaction force through the timing belt 36, which occurs immediately after the stop, to pivot in an opposite direction with the intermediate bracket 42, and it may be determined whether the switch SW1 operates appropriately on the basis of whether the switch SW1 is turned on.

Similarly, when it is determined in step SC9 that the switch SW2 is abnormal, energization to the motor 32 may be stopped immediately and the motor 32 may be caused by the reaction force through the timing belt 36, which occurs immediately after the stop, to pivot in an opposite direction with the intermediate bracket 42, and it may be determined whether the switch SW1 operates appropriately on the basis of whether the switch SW1 is turned on. Not to mention, also in the determination about the switch SW1, the abnormality detection timer is set and, similar to step SC6, the switch SW1 is determined as being abnormal on the basis of the counting up of the abnormality detection timer.

The self-diagnosis device 54 may be configured to generate a pseudo abnormality by driving the movable cover 14 lying in a closed position and locked mechanically in an opening direction via the driving circuit 30. The situation is utilized where the movable cover 14 is incapable of moving even if driven in an opening direction when the movable cover 14 lies in a closed position and locked mechanically. An algorithm similar to the abnormality determination algorithm illustrated in FIG. 7 is used.

Also, the self-diagnosis device 54 may be configured to generate a pseudo abnormality by driving the movable cover 14 lying between the fully open position and the closed position via the driving circuit 30 through application of torque higher than predetermined torque.

When driven via the driving circuit 30, the movable cover 14 lying in an intermediate position moves as normal in the absence of an obstacle. However, when the motor 32 is driven abruptly with torque higher than that in normal control, the reaction force against the driving power exerted on the timing belt 36 from the output shaft of the motor 32 causes the motor 32 to pivot in an opposite direction with the intermediate bracket 42. The operating state of the switch SW1 or the switch SW2 at this time may be detected to determine abnormality. When the motor 32 is driven in a closing direction, the state of the switch SW2 can be determined and when the motor 32 is driven in an opening direction, the state of the switch SW1 can be determined.

Although in the above-described embodiment, an example in which the self-diagnosis device is operated when the machine tool is started is described, the self-diagnosis device may be configured to be operated when the machine tool is stopped after the end of a daily machining schedule. In addition, instead of performing the operation every time the machine tool is started or stopped (every day), it may be performed at suitable time intervals such as once in two days or once a week.

Not to mention, the present invention may even be applied to an abnormality detection device different from the abnormality detection device 40 described above.

For example, the abnormality detection device 40 may include a torque detection circuit that detects torque exerted on the output shaft of the motor 32 while the movable cover 14 is driven, and an abnormality determination circuit that determines abnormality when the torque detected by the torque detection circuit deviates from a predetermined range, and also in this case, it may be determined whether the abnormality detection device operates normally on the basis of the torque detected when a pseudo abnormality is generated. For example, the torque of the motor 32 may be raised intentionally by driving the movable cover 14 that is closed in a closing direction.

The abnormality detection device 40 may include a pressure sensor that is provided on the movable cover 14 and an abnormality determination circuit that determines abnormality when pressure detected by the pressure sensor while the movable cover 14 is driven is higher than predetermined pressure. The pressure sensor detects the state where a worker or the like is pinched by the movable cover 14. In this case, it is necessary to avoid erroneous determination caused by the pressure sensor outputting an abnormality when the movable cover 14 reaches the fully closed position and is pressed between the fixed cover 13 and the movable cover 14 by including a gate circuit that cancels the output of the pressure sensor immediately before the movable cover 14 reaches the fully closed position.

A pseudo abnormality may be generated so as to diagnose whether such a pressure sensor operates. For example, similar to the above, it can be determined whether the pressure sensor operates by driving the movable cover 14 in the fully closed state in a closing direction and disabling the gate circuit.

In any of the cases, it is preferable that self-diagnosis can be performed in a state where the movable cover 14 remains unmoving even when a pseudo abnormality is generated.

Although in the above-described embodiment, an example is described in which the self-diagnosis processing circuit 54 that is a self-diagnosis device drives the driving circuit 30 that is a servo amplifier via the command circuit 104 of the NC device 100 to generate a pseudo abnormality, the self-diagnosis processing circuit 54 may directly provide a command to the driving circuit 30 without involvement of the command circuit 104 to generate a pseudo abnormality.

Although in the above-described embodiment, a movable cover for the opening and closing of an opening through which a worker comes in and goes out is described, not to mention, the movable cover as a focus of the present invention can be applied to, for example, a movable cover for the opening and closing of an opening that is formed through the ceiling wall of the fixed cover and used to carry in a workpiece.

Although in the above-described embodiment, a lathe is taken as an example of the machine tool, the machine tool to which the present invention is applied is not limited to a lathe but, not to mention, encompasses any machine tool, which includes, for example, a machining center for machining a workpiece into a desired shape by relatively moving the workpiece, which is fixed to a work table that can move in a straight line or rotate, and a tool fixed to a spindle head that can move in a straight line or rotate, an additive manufacturing machine for processing a material such as metal powder into a given shape through application of laser beams thereon, and a grinding machine for grinding the outer edge of a workpiece using a grindstone.

Although embodiments and aspects of the present invention are described above, the contents of the disclosure may be varied in details of the configurations, and combinations of the elements, change in order, and the like can be achieved without deviation from the claimed scope and principles of the present invention.

INDUSTRIAL APPLICABILITY

As described above, the present invention can attain a machine tool that can perform self-diagnosis on whether a safety mechanism operates properly.

Although preferred embodiments of the present invention at this point in time are described, it is to be understood that such disclosure is not to be interpreted as limiting. Various alterations and modifications will no doubt become apparent to those skilled in the art to which the present invention pertains after they read the disclosure described above. Accordingly, it is intended that the appended claims be interpreted as covering all alterations and modifications while not deviating from the true spirit and scope of the present invention.

REFERENCE SIGNS LIST

10: Machine tool
13: Fixed cover
14: Movable cover
20: Cover control device
30: Driving circuit (Servo amplifier)
32: Servo motor
34: Power transmission mechanism
40: Abnormality detection device
50: System control device of movable cover
52: Abnormality detection processing circuit
54: Self-diagnosis device (Self-diagnosis processing circuit)
100: NC device
104: Command circuit (PLC circuit)
120: Operation panel
121: Output device (Display device)
122: Input device
200: Cover control system

The invention claimed is:

1. A machine tool including a fixed cover and a movable cover for covering at least part of a machining region, the machine tool comprising:
   a cover control device that includes a driving circuit for driving the movable cover;
   an abnormality detection device that detects an abnormality while the movable cover is driven;
   a self-diagnosis device that performs evaluation on whether the abnormality detection device is normal; and
   an output device that outputs a result of the evaluation by the self-diagnosis device, wherein
   the self-diagnosis device performs the evaluation on whether the abnormality detection device is normal based on an operating state of the abnormality detection device at a time when a pseudo abnormality that imitates an actual abnormality is generated on the movable cover by driving the movable cover via the driving circuit.

2. The machine tool according to claim 1, wherein the self-diagnosis device generates the pseudo abnormality by driving the movable cover lying in a closed position in a closing direction via the driving circuit.

3. The machine tool according to claim 1, wherein the self-diagnosis device generates the pseudo abnormality by driving the movable cover lying in a closed position and locked mechanically in an opening direction via the driving circuit.

4. The machine tool according to claim 1, wherein the self-diagnosis device generates the pseudo abnormality by driving the movable cover lying in a fully open position in an opening direction via the driving circuit.

5. The machine tool according to claim 1, wherein the self-diagnosis device generates the pseudo abnormality by driving the movable cover lying between a fully open position and a closed position via the driving circuit through application of torque higher than predetermined torque.

6. The machine tool according to claim 1, wherein the cover control device includes the driving circuit, a motor driven by the driving circuit, and a power transmission mechanism that transmits power from an output shaft of the motor to the movable cover, and
   the abnormality detection device includes a support mechanism that supports the motor so that the motor is pivotable about the output shaft of the motor, and an abnormality determination circuit that determines abnormality by detecting a pivoting state of the motor supported by the support mechanism based on reaction force applied from the movable cover to the motor through the power transmission mechanism while the movable cover is driven.

7. The machine tool according to claim 1, wherein the cover control device includes the driving circuit, a motor driven by the driving circuit, and a power transmission mechanism that transmits power from an output shaft of the motor to the movable cover, and
   the abnormality detection device includes a torque detection circuit that detects torque exerted on the output shaft of the motor while the movable cover is driven, and an abnormality determination circuit that determines abnormality when the torque detected by the torque detection circuit deviates from a predetermined range.

8. The machine tool according to claim 1, wherein
the cover control device includes the driving circuit, a motor driven by the driving circuit, and a power transmission mechanism that transmits power from an output shaft of the motor to the movable cover, and
the abnormality detection device includes a pressure sensor that is provided on the movable cover, and an abnormality determination circuit that determines abnormality when pressure detected by the pressure sensor while the movable cover is driven is higher than predetermined pressure.

9. The machine tool according to claim 1, wherein
driving of the cover control device is prohibited if the self-diagnosis device evaluates the abnormality detection device as being abnormal.

10. The machine tool according to claim 9, wherein
manual opening of the movable cover is allowed if the self-diagnosis device evaluates the abnormality detection device as being abnormal.

11. The machine tool according to claim 1, wherein
the self-diagnosis device is configured to be operated when the machine tool is started or stopped.

12. A self-diagnosis method for a machine tool including a cover control device that drives a movable cover via a driving circuit and an abnormality detection device that detects an abnormality while the movable cover is driven, the self-diagnosis method comprising:
a pseudo abnormality generation step of generating a pseudo abnormality that imitates an actual abnormality on the movable cover by driving the movable cover via the driving circuit;
a self-diagnosis step of, when the pseudo abnormality is generated by the pseudo abnormality generation step, performing evaluation on whether the abnormality detection device is normal based on whether the abnormality is detected by the abnormality detection device; and
an output step of outputting a result of the evaluation by the self-diagnosis step.

13. The self-diagnosis method for the machine tool according to claim 12, wherein
the self-diagnosis step is a step of generating the pseudo abnormality by driving the movable cover lying in a closed position in a closing direction via the driving circuit.

14. The self-diagnosis method for the machine tool according to claim 12, wherein
the self-diagnosis step is a step of generating the pseudo abnormality by driving the movable cover lying in a closed position and locked mechanically in an opening direction via the driving circuit.

15. The self-diagnosis method for the machine tool according to claim 12, wherein
the self-diagnosis step is a step of generating the pseudo abnormality by driving the movable cover lying in a fully open position in an opening direction via the driving circuit.

16. The self-diagnosis method for the machine tool according to claim 12, wherein
the self-diagnosis step is a step of generating the pseudo abnormality by driving the movable cover lying between a fully open position and a closed position via the driving circuit through application of torque higher than predetermined torque.

17. The self-diagnosis method for the machine tool according to claim 12, wherein
the self-diagnosis step is performed when the machine tool is started or stopped.

\* \* \* \* \*